UNITED STATES PATENT OFFICE.

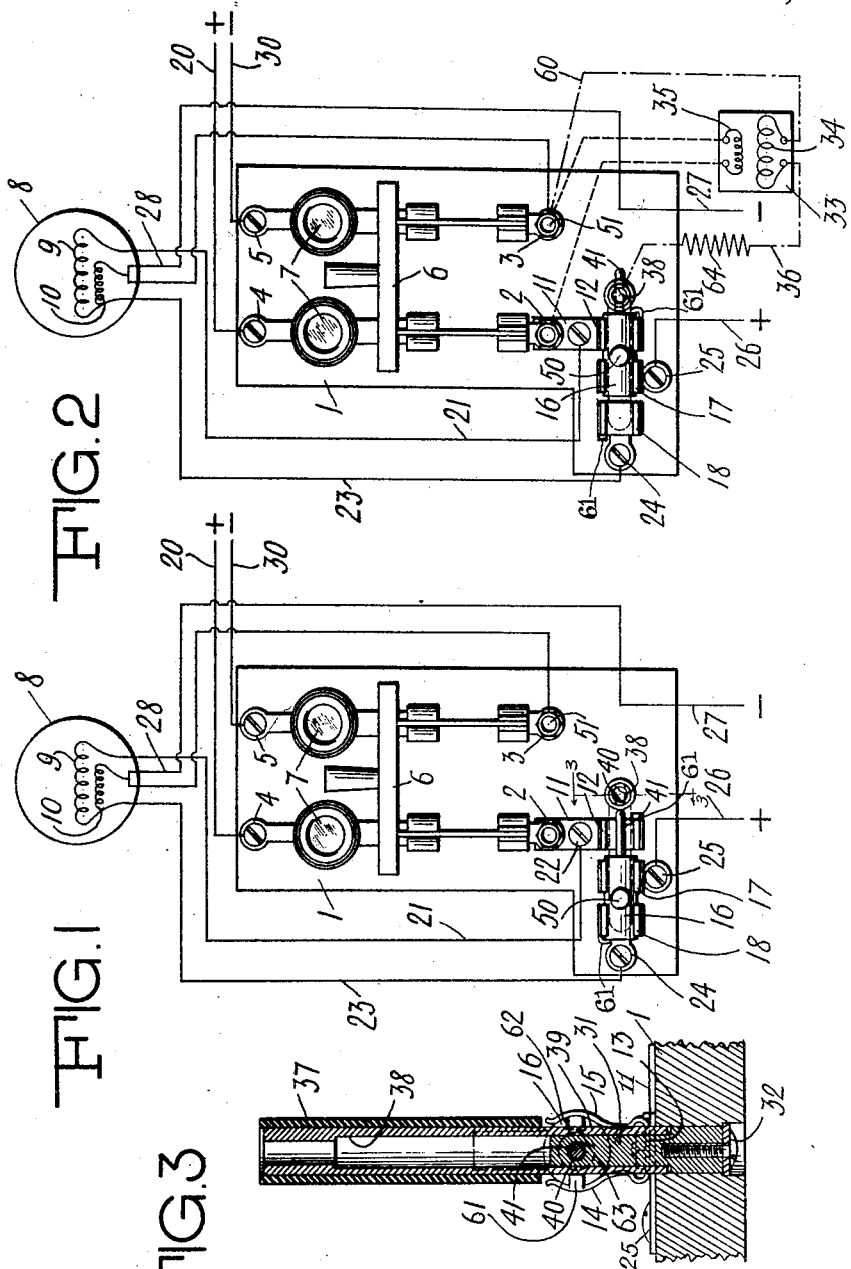

FREDRICK ZENKER, OF HIGHLAND PARK, AND JOSEPH SCHEPPERLY, OF DETROIT, MICHIGAN, ASSIGNORS TO SQUARE D. COMPANY, OF DETROIT, MICHIGAN, A CORPORATION OF MICHIGAN.

METER-TEST APPARATUS.

1,409,637. Specification of Letters Patent. Patented Mar. 14, 1922.

Application filed July 26, 1917, Serial No. 182,849. Renewed April 24, 1920. Serial No. 376,432.

*To all whom it may concern:*

Be it known that we, FREDRICK ZENKER, a subject of the Emperor of Germany, residing at Highland Park, county of Wayne, and State of Michigan, and JOSEPH SCHEPPERLY, a citizen of the United States, residing at Detroit, in the county of Wayne and State of Michigan, have invented certain new and useful Improvements in Meter-Test Apparatus, of which the following, taken in connection with the accompanying drawings, is a full, clear, and concise description thereof.

This invention relates to meter testing appurtenances and with regard to certain more specific features thereof to switches for effecting changes in circuit conditions to render a normal service circuit suitable for a meter-testing operation.

The invention has for one of its objects to provide an extremely simple and compact switching mechanism of the character above specified.

Another object of the invention resides in the provision of improved means for reducing to a minimum the number of operations necessary to convert a normal service circuit into condition for meter testing and vice versa.

Other objects will be in part obvious and in part pointed out hereinafter.

The invention accordingly consists of the various features of construction, combination of elements and arrangement of parts which will be exemplified by the construction hereinafter set forth and the scope of the application of which will be indicated by the following claims.

In the accompanying drawings wherein is shown one of various possible embodiments of the invention:

Fig. 1 is a schematic view of a service system including a meter and with the improved switching mechanism included in position for normal service operation.

Fig. 2 is a schematic view of the same but with the switch shown in position for meter testing purposes; and Fig. 3 is a somewhat enlarged and detailed view of the switch.

Referring now more particularly to the drawings there is indicated at 1 a base block upon which are mounted load circuit terminals 2 and 3 and service circuit terminals 4 and 5. A single throw double-pole switch is indicated at 6 adapted to connect the service wire terminals with the load circuit terminals, and suitable protective devices are included between the pairs of terminals in the nature of screw plug fuses 7 of usual construction. A house meter for measuring the load current is indicated at 8, comprising a series coil 9 and a potential coil 10.

In electrical communication with the positive load terminal 2, there is a contact strip 11 which in turn is electrically connected to a clip 12, the latter comprising a base 13 and upstanding curvilinear walls 14 and 15 for the reception of a cylindrical bridging element or plug 16. Two similar clips 17 and 18 are serially arranged with respect to the first-mentioned clip and in relatively spaced relation. Normally the cylindrical bridging plug bridges these two last mentioned clips, so that the normal service circuit is from the positive service wire 20 through the positive fuse, positive side of main switch, load terminal 2, contact strip 11 through a conductor 21, one end of which communicates with said strip at 22, through the series coil 9, conductor 23, a contact 24 in electrical communication with the clip 18 through said clip through the bridging plug 16, to clip 17, through a contact 25 in electrical communication with the last mentioned clip, through positive load wire 26, through the load and thence, returning through negative load wire 27 through a loop 28 thereof, to which potential coil 10 is connected, through the negative load terminal 3 and thence, as will be obvious, to the negative service wire 30. This, it will be seen, includes the house meter in circuit for measuring the current consumed by the load.

An upstanding contact post is indicated at 31, and is a part of the general fixed switch arrangement of the invention. This communicates with contact 24 by means of a back connector 32. A test meter 33 comprises a series coil 34 and a potential coil 35 and at the end of one of the leads 36 extending from one side of the series coil there is provided a handle 37 of insulating material, which in turn is equipped with a metal insert 38 extending throughout its length and projecting from its outer end in the form of a split socket 39 which is adapted to engage the upstanding contact post 31. An insulated bore 40 through the split hollow post-engaging portion or socket 39 is adapted to align with an insulated bore of like diameter through said post, and the cylindrical bridging plug 16 is provided with an extending locking pin 41 adapted when the plug is moved to meter-test contacting position to pass through the post and handle and prevent relative movement of same until the bridging plug is moved back into a position where a normal service condition of the circuits obtains.

Assuming that with the parts in position, as shown in Fig. 1, it is desired to make a test of the house meter, the cylindrical switch plug 16 is moved by means of an insulating handle 50 to the right, as in Fig. 2, to bridge the contact clips 12 and 17. One side of the series coil of the test meter is tapped into the upper end of the handle 37, as heretofore described, and the other side is tapped into a socket 51 provided in electrical communication with the negative load terminal 3. The cords of the potential coil are tapped in, as shown, at the positive and negative load terminals. In moving the bridging plug 16 to the right, as shown in Fig. 2, the house meter is temporarily by-passed and a direct circuit is established from the positive service wire 20 to the positive load wire 26, through contacts 12 and 17, which are now in electrical connection by means of the bridging plug 16. Attention is directed to the length of the bridging plug and the distance between the three clips 12, 17 and 18. This construction insures bridging of the clips 12 and 17 before clips 17 and 18 become electrically disconnected. The meter test circuit is as follows:

From the positive load terminal through the contact strip 11, conductor 21, house meter series coil 9, conductor 23, contact 24, thence through the contact connector strip 32 (shown clearly in Fig. 3) to post 31, metal insert 38, test meter cord 36, test meter series coil 34, test meter cord 60 to negative load terminal 3.

The end clips 12 and 18 of the switching device are provided with inturned lugs, one of which is shown at 61, which serve to limit the movement of the bridging plug in either direction. The plug is splined at 62 and engages with an inturned projection 63 of the middle clip 17 which prevents any substantial rotary movement of the plug within the clips.

The resistance load is indicated at 64, but for the purposes of this invention it is immaterial what form of load or what form of unbalancing medium is used.

Attention is directed to the simplicity of the switching device which requires only a slight longitudinal movement to convert the entire system from normal service condition to a condition for meter test or vice versa. The switch is simple in construction, inexpensive to manufacture and reliable in operation.

As many changes could be made in the above construction and as many apparently widely different embodiments of the invention could be made without departing from the scope thereof, is is intended that all matter set forth in the foregoing description or shown in the accompanying drawings shall be interpreted as illustrative and not in a limiting sense.

What is claimed is:

1. In service and meter-test apparatus, in combination, an electrical circuit adapted to normally include the series coil of a house meter in series arrangement with a load, a plurality of contacts spaced in serial arrangement, a slidable bridging member adapted to be moved to bridging position relatively to different pairs of said contacts, one position establishing a normal service condition of the apparatus and another position establishing a meter test condition of the apparatus, and means to provide for the cutting in of the series coil of the test meter, comprising a test connector in fixed relation to said first-mentioned contacts and electrically connected to the contact from which said bridging member is moved to provide a testing condition, said test connector comprising a post having means adapted to co-operate with said slidable bridging member to lock thereto a test lead.

2. In service and meter test apparatus, in combination, an electrical circuit adapted to normally include the series coil of a house meter in series arrangement with a load, a plurality of contacts spaced in serial arrangement, a slidable bridging member adapted to be moved to bridging position relatively to different pairs of said contacts, one position establishing a normal service condition of the apparatus and another position establishing a meter test condition of the apparatus, and means whereby disengagement of said engaging members is prevented after a test condition is established until the normal condition is re-established.

3. In service and meter-test apparatus, in combination, a set of three clip contacts mounted serially in spaced relation, a contact post in alignment with said clip contacts and adapted to receive a test meter lead connection, and a cylindrical bridging plug supported in said contacts and adapted for longitudinal movement to engage with different contacts of said set.

4. In service and meter-test apparatus, in combination, a set of three clip contacts mounted serially in spaced relation, a contact post in alignment with said clip contacts and adapted to receive a test meter lead connection, a cylindrical bridging plug supported in said contacts and adapted for longitudinal movement to engage with different contacts of said set, and means actuated by said plug for locking the test-meter lead connection in associated relation with said post when said plug is in bridging relation with certain of said contacts.

5. In service and meter-test apparatus, in combination, a set of three clip contacts mounted serially in spaced relation, a contact post in alignment with said clip contacts and adapted to receive a test meter lead connection, and a cylindrical bridging plug supported in said contacts and adapted for longitudinal movement to engage with different contacts of said set, the arrangement and dimensions of the contacts and plug being such that the latter makes contact with the first of said contacts before breaking with the third and vice versa.

6. In service and meter-test apparatus, in combination, a set of three clip contacts mounted serially in spaced relation, a contact post in alignment with said clip contacts and adapted to receive a test-meter lead connection, a cylindrical bridging plug supported in said contacts and adapted for longitudinal movement to engage with different contacts of said set, and means actuated by said plug for locking the test-meter lead connection in associated relation with said post when said plug is in bridging relation with certain of said contacts, the arrangement and dimensions of the contacts and plug being such that the latter makes contact with the first of said contacts before breaking with the third and vice versa.

7. In service and meter-test apparatus, in combination, a set of three clip contacts mounted serially in spaced relation, a contact post in alignment with said clip contacts and adapted to receive a test-meter lead connection, a cylindrical bridging plug supported in said contacts and adapted for longitudinal movement to engage with different contacts of said set, a handle for operating said plug, and means for preventing rotative movement of said plug while permitting longitudinal movement of the same relatively to said contacts.

FREDRICK ZENKER.
JOSEPH SCHEPPERLY.